US009947915B2

(12) United States Patent
Kim et al.

(10) Patent No.: US 9,947,915 B2
(45) Date of Patent: Apr. 17, 2018

(54) LITHIUM MANGANESE SECONDARY BATTERY

(75) Inventors: Sun Kyu Kim, Gyeonggi-do (KR); Kyung Min Jun, Daejeon (KR); Seung Don Choi, Daejeon (KR); Hong Kyu Park, Daejeon (KR)

(73) Assignee: LG Chem, Ltd. (KR)

( * ) Notice: Subject to any disclaimer, the term of this patent is extended or adjusted under 35 U.S.C. 154(b) by 1913 days.

(21) Appl. No.: 11/676,723

(22) Filed: Feb. 20, 2007

(65) Prior Publication Data

US 2007/0202411 A1 Aug. 30, 2007

(30) Foreign Application Priority Data

Feb. 17, 2006 (KR) ........................ 10-2006-0015862

(51) Int. Cl.

| | |
|---|---|
| ***H01M 4/131*** | (2010.01) |
| ***H01M 4/133*** | (2010.01) |
| ***H01M 4/505*** | (2010.01) |
| ***H01M 4/62*** | (2006.01) |
| ***H01M 10/0525*** | (2010.01) |

(52) U.S. Cl.

CPC ........... *H01M 4/131* (2013.01); *H01M 4/133* (2013.01); *H01M 4/505* (2013.01); *H01M 4/62* (2013.01); *H01M 10/0525* (2013.01); *Y02T 10/7011* (2013.01)

(58) Field of Classification Search

CPC ........ H01M 4/62; H01M 4/628; H01M 4/626; H01M 4/133; H01M 4/1393; H01M 4/366; H01M 4/505; H01M 4/9058; H01M 4/855; H01M 4/90; H01M 4/88; H01M 10/0525; B01J 37/16; B01J 35/00; Y02T 10/7011

USPC ........................................... 429/231.4–231.9

See application file for complete search history.

(56) References Cited

U.S. PATENT DOCUMENTS

| | | | | |
|---|---|---|---|---|
| 6,451,482 | B1 | 9/2002 | Watanabe et al. | |
| 6,767,669 | B2 | 7/2004 | Matsubara et al. | |
| 6,800,397 | B2 * | 10/2004 | Okada | 429/231.95 |
| 7,335,321 | B1 * | 2/2008 | Birke | H01M 4/02 252/500 |
| 2002/0039684 | A1 * | 4/2002 | Matsubara et al. | 429/231.4 |
| 2003/0054247 | A1 | 3/2003 | Ogasawara et al. | |
| 2005/0170250 | A1 | 8/2005 | Ohzuku et al. | |
| 2006/0147790 | A1 * | 7/2006 | Zaghib | C09C 1/46 428/403 |
| 2006/0147797 | A1 * | 7/2006 | Wu et al. | 429/218.1 |

FOREIGN PATENT DOCUMENTS

| | | | |
|---|---|---|---|
| CN | 1339834 | | 3/2002 |
| KR | 1019990077427 | A | 10/1999 |
| KR | 1020030062541 | | 7/2003 |
| KR | 1020030078019 | | 10/2003 |
| KR | 1020040071510 | | 8/2004 |
| KR | 1020050114516 | A | 12/2005 |
| KR | 1020060028327 | A | 3/2006 |
| KR | 1020060085085 | A | 7/2006 |
| WO | WO2001-41246 | * | 6/2001 |
| WO | WO2004/038834 | * | 5/2004 |

OTHER PUBLICATIONS

Hanaor, Dorian A. H.; Sorrell, Charles C. (2011). "Review of the anatase to rutile phase transformation". Journal of Materials Science 46 (4): 855-874.*

Handbook of Mineralogy. "Anatase". www.handbookofmineralogy.org/pedfs/anatase.pdf 2001-2005.*

European Search Report of Dec. 23, 2009; corresponding to PCT/KR2007000834 claiming priority to Korean Patent Application No. 10-2006-0015862.

Korean Notice of Allowance dated May 30, 2008 for Application No. 10-2007-0016487.

Chinese Office Action—CN 20078000537.4 dated Apr. 30, 2010.

Taiwan Office Action for application No. 096106030 dated Sep. 16, 2010 with English Translation.

International Search Report for application No. PCT/KR2007/000834; dated May 28, 2007.

Komaba et al.; "Influence of manganese(II), cobalt(II), and nickel(II) additives in electrolyte on performance of graphite anode for lithium-ion batteries"; Electrochimica Acta, vol. 47, 2002, pp. 1229-1239.

* cited by examiner

*Primary Examiner* — Stephen J Yanchuk

(74) *Attorney, Agent, or Firm* — Lerner, David, Littenberg, Krumholz & Mentlik, LLP

(57) ABSTRACT

Disclosed is a manganese-based lithium secondary battery comprising a cathode containing manganese-based lithium metal oxide, an anode, and an electrolyte, wherein the anode comprises an anode active material in which a Mn scavenger capable of reducing manganese ions on a surface by conducting or semiconducting properties is coated on part or all of anode active material particles. Through the use of the Mn scavenger, manganese ion dissolved from the manganese-based cathode active material into the electrolyte is preferentially deposited on the Mn scavenger coated on the surface of the anode active material particles, such that the dissolved manganese ion is inhibited from being deposited directly on the surface of the anode active material, and a decomposition of the electrolyte with the deposited manganese component is inhibited. Accordingly, the use of the Mn scavenger can provide a manganese-based lithium secondary battery having excellent storage performance.

8 Claims, No Drawings

LITHIUM MANGANESE SECONDARY BATTERY

This application claims the benefit of the filing date of Korean Patent Application No. 2006-15862, filed on Feb. 17, 2006, in the Korean Intellectual Property Office, the disclosure of which is incorporated herein in its entirety by reference.

TECHNICAL FIELD

The present invention relates to a high-performance manganese-based lithium secondary battery comprising an anode in which a Mn scavenger capable of reducing manganese ions on a surface by conducting or semiconducting properties is coated on part or all of anode active material particles.

BACKGROUND ART

As the technology development and demand for mobile devices have increased, the demand for secondary batteries as energy sources has also rapidly increased. Among such secondary batteries, lithium secondary batteries having high energy density and discharge voltage have been much studied and have been widely used for commercial purposes. Furthermore, as the development of electric automobiles, such as hybrid automobiles, which can solve environmental problems caused by car exhaust gases, has been accelerated, studies focused on using lithium secondary batteries as power sources for such automobiles also have greatly advanced.

The lithium secondary battery comprises a cathode (positive electrode), an anode (negative electrode) and an electrolyte, and is chargeable and dischargeable, because lithium ions coming out from a cathode active material during the first charge process are intercalated into an anode active material, for example, carbon particles, and deintercalated during the discharge process, so that the lithium ions run between both electrodes while serving to transfer energy.

Cathode active materials for use in the lithium secondary batteries include lithium-cobalt composite oxide, lithium-nickel composite oxide, and lithium-manganese composite oxide, and among them, the lithium-manganese composite oxide based on manganese, which is abundant and inexpensive, receives attention.

However, the Mn-based lithium secondary batteries have problems in that, as charge/discharge cycles are repeated, manganese is dissolved into the electrolyte, the dissolved manganese component is deposited on the surface of the anode active material, for example, a carbon material, and the manganese component deposited on the surface of the anode active material receives electrodes from the anode active material, so that it promotes the decomposition of the electrolyte in the anode active material by a reduction reaction so as to increase the resistance of the battery, thus degrading the battery. According to literature [Electrochimica Acta 47 (2002) 1229-1239], it can be seen that manganese deposited on the surface of the anode active material rapidly reduce the reversible capacity of the lithium ion batteries.

This deposition of the manganese component becomes more serious during high-temperature storage, resulting in an increase in the resistance of batteries. When the manganese-based lithium secondary battery is used as a power source for electric automobiles, the aforementioned problems lead to a serious decrease in output, and thus act as major causes interfering with the development of high-performance (high output) manganese-based lithium secondary batteries.

Prior studies focused on preventing deterioration in the performance of such manganese-based lithium secondary batteries include methods of inhibiting the dissolution of spinel structures, and methods that use electrolyte additives. However, according to these methods, the dissolution is still not completely inhibited, and the electrolyte is also deteriorated during high-temperature storage, leading to deterioration in battery performance.

Accordingly, there is a high need for a manganese-based lithium secondary battery, which can solve the aforementioned problems, and thus can exhibit excellent storage characteristics during long-term storage even at high temperatures.

DISCLOSURE OF THE INVENTION

Therefore, it is an object of the present invention to prevent performance deterioration caused by manganese deposited onto the surface of an anode active material.

The present inventors have conducted deep studies and various experiments and, as a result, have found that, when an inorganic material (Mn scavenger) having manganese affinity and conducting or semiconducting properties is coated on the surface of an anode active material, manganese will be deposited on the inorganic material, so that the direct deposition of manganese on the anode active material can be inhibited and thus the promotion of electrolyte decomposition, caused by manganese deposited directly on the anode active material, can be inhibited, thereby completing the present invention.

In one aspect, the present invention provides a manganese-based lithium secondary battery comprising: a cathode containing manganese-based lithium metal oxide; an anode; and an electrolyte, wherein the anode comprises an anode active material in which a Mn scavenger capable of reducing manganese ions on a surface by conducting or semiconducting properties is coated on part or all of anode active material particles.

In another aspect, the present invention provides an anode active material in which a Mn scavenger capable of reducing manganese ions on a surface by conducting or semiconducting properties is coated on part or all of anode active material particles, as well as an anode comprising said anode active material.

MODE FOR CARRYING OUT THE INVENTION

Hereinafter, the present invention will be described in detail.

The Mn scavenger according to the present invention should have conducting or semiconducting properties, such that it can receive electrons. Also, it is preferably a material having affinity for manganese.

Materials usable as the Mn scavenger include electron-conducing titanium-based compounds, non-limiting examples of which include $TiO_2$ and $TiS_2$. In some cases, mixtures thereof can also be used. The Mn scavenger is preferably in the form of oxide, and is particularly preferably $TiO_2$. As disclosed in Comparative Examples below, $ZrO_3$, MgO and $Al_2O_3$ cannot serve as the Mn scavenger, because they are non-conducting materials, which cannot reduce manganese ions.

According to experiments conducted by the present inventors, it was found that manganese was deposited on the surface of a coating layer formed of the Mn scavenger during long-term storage, and this action inhibited an increase in the resistance of batteries during long-term storage (see Table 2).

The Mn scavenger coated on the surface of an anode active material such as a carbonaceous material can deposit Mn on the surface thereof by receiving electrons from the anode active material, which is in direct contact with the Mn scavenger.

For example, a coating layer of $TiO_2$ having the ability as the Mn scavenger is applied on the surface of a carbon-based anode active material, and thus can greatly mitigate the degradation of the carbon-based anode active material, caused by manganese deposited directly on the carbonaceous surface of the anode during long-term storage.

Because the Mn scavenger is coated on the surface of the anode active material, the manganese ions are first brought into contact with the Mn scavenger, and the manganese ions on the contact surface of the Mn scavenger are reduced by receiving electrons from the contact surface of the Mn scavenger. The reduced manganese is preferentially deposited on the Mn scavenger, because the Mn scavenger has affinity to the manganese such that the manganese is not moved to the surface of the anode active material.

As described above, because manganese is preferentially deposited onto the surface of the Mn scavenger, manganese in the manganese-based lithium secondary battery is deposited on the coating layer of the Mn scavenger, but not on the carbonaceous surface of the anode active material, and thus the coating layer of the Mn scavenger acts to inhibit the degradation of the anode active material.

With respect to the specific operational principle of the Mn scavenger, $Mn^{2+}$ is reduced on $TiO_2$ while it is stabilized in the form of O—Ti—O—Mn or $(TiO_2)Mn$, and thus it is possible to inhibit the phenomenon in which manganese increase resistance by promoting electrolyte decomposition when deposited directly on the surface of the anode active material.

The Mn scavenger is preferably used in an amount of 0.1-20 wt %, and more preferably 1-10 wt %, based on the total weight of the anode active material. At less than 0.1 wt %, it is difficult to expect effects resulting from the formation of a coating layer, and at more than 20 wt %, it can reduce the output voltage of the battery.

Anode active materials usable in the present invention are not specifically limited, and examples thereof include lithium-insertable materials, such as lithium alloys, carbon, petroleum coke, activated carbon, graphite, and other carbons, which can insert and release lithium. Also, it is possible to use metal oxides such as $Li_4Ti_5O_{12}$, which can insert and release lithium and have a potential of less than 2V for lithium.

Carbon-based anode active materials are preferred, and non-limiting examples thereof include graphite-based carbon, coke-based carbon, and hard carbon.

The form of the coating layer according to the present invention can be various, and, for example, the coating layer can be formed either on the entire surface of the active material particles or on only part of the surface of the active material particles. Also, the coating layer formed on only part of the surface includes a coating layer in a cluster form.

The method of forming the Mn scavenger coating layer is not specifically limited, and it is possible to use, for example, a dry method, a wet method, a vapor phase method, an electroless plating method and the like, which are known in the art in connection with the formation of a coating layer of metal oxide.

The dry method comprises mixing the Mn scavenger without any solvent, and the wet method comprises adding a suitable solvent, such as ethanol, methanol, water or acetone, to facilitate a reaction, and mixing the Mn scavenger to a solvent-free state.

Examples of the dry method include a mortar grinder mixing method and a Mechano-fusion method.

Hereinafter, one embodiment of the method of preparing the anode active material having the Mn scavenger coated on part or all thereof will be described.

An anode active material itself (e.g., carbonaceous material, metal or metal oxide) to be coated or a precursor compound thereof (e.g., water-soluble or water-insoluble metal compounds, such as hydroxide of each metal, metal nitrate, metal oxide, metal carbonate, metal acetate, metal oxalate, metal sulfate and metal chloride) having the desired equivalent ratio, are mixed with a Mn scavenger material.

Before the mixture thus prepared is thermally treated, it is preferably compressed into pellets, but this compression process may also be omitted.

The mixture prepared through the aforementioned process is thermally treated at 350-550° C. for 1-10 hours to prepare an anode active material powder comprising the Mn scavenger coated on part or all thereof. The thermal treatment process is performed by elevating and lowering the temperature of the mixture at a rate of 0.5-10° C./min, and comprises maintaining the mixture at each of heat treatment temperatures at a given time.

As the Mn scavenger particles to be coated, it is possible to use those having a mean particle size between a few tens of nanometers and a few hundreds of nanometers. Because the particle size of the material for use as the anode active material is between a few microns and less than 50 microns, the Mn scavenger particles are preferably smaller than the anode active material.

The anode active material coated with the Mn scavenger as described above is preferably thermally treated at 350-500° C., such that the Mn scavenger is adsorbed on the surface of the anode active material in a stable state.

The coating layer of the Mn scavenger on the anode active material preferably has a thickness of 3-500 nm. If the coating layer has a thickness of more than 500 nm, it can act as resistance during the charge/discharge of the battery, thus reducing the use efficiency of the battery.

In another aspect, the present invention provides a high-performance lithium secondary battery, in which the anode active material comprising the Mn scavenger coated on part or all thereof as described above is used as the component of an anode. The high-performance lithium secondary battery according to the present invention is very useful as a power source for electric automobiles, including hybrid automobiles.

The lithium secondary battery, which comprises a cathode, an anode comprising the anode active material according to the present invention, a separator and a lithium salt-containing non-aqueous electrolyte, can be fabricated using any conventional method known in the art. In one embodiment, the lithium secondary battery is fabricated by interposing the separator between both the electrodes to form an assembly, and then injecting the electrolyte into the assembly.

The cathode is fabricated, for example, by applying a mixture of a cathode active material, a conducting material and a binder on a cathode collector, and then by drying the applied mixture. If necessary, a filler may also be further added to the mixture.

Lithiated manganese oxide having a spinel structure, or a mixture of lithiated manganese oxide having a spinel structure and other cathode active material(s) can be used as the cathode active material. In order for the Mn scavenger according to the present invention to perform the function thereof, the cathode preferably comprises more than 30 wt % of a manganese spinel-based cathode active material.

The collector is not specifically limited as long as it is made of a conducting material, but the cathode collector is preferably a foil made of aluminum, nickel or a combination thereof.

The anode in the present invention may comprise, in addition to the anode active material prepared according to the present invention, a conducting material for providing electrical conductivity, and a binder allowing the adhesion between the material and the collector. The anode active material prepared according to the above-described method is mixed with 1-30 wt % of the conducting material and 1-10 wt % of the binder, the mixture is added to a dispersing agent and stirred to prepare a paste, and the paste is applied on a metallic collector, compressed and then dried, thus preparing an anode in a laminate form.

The anode collector is preferably a foil made of copper, gold, nickel, copper alloy or a combination thereof.

A separator which can be used in the present invention is not limited to any specific separator, but a porous separator may be used and examples thereof include porous polypropylene, polyethylene or polyolefin separators.

Examples of an electrolyte, which can be used in the present invention, include those in which salts having a structure such as $A^+B^-$, wherein $A^+$ contains an ion selected from among alkaline metal cations, such as $Li^+$, $Na^+$ and $K^+$, and combinations thereof, and $B^-$ contains an ion selected from among anions, such as $PF_6^-$, $BF_4^-$, $Cl^-$, $Br^-$, $I^-$, $ClO_4^-$, $AsF_6^-$, $CH_3CO_2^-$, $CF_3SO_3^-$, $N(CF_3SO_2)_2^-$, and $C(CF_2SO_2)_3^-$, and combinations thereof, are dissolved or dissociated in an organic solvent selected from the group consisting of propylene carbonate (PC), ethylene carbonate (EC), diethyl carbonate (DEC), dimethyl carbonate (DMC), dipropyl carbonate (DPC), dimethyl sulfoxide, acetonitrile, dimethoxyethane, diethoxyethane, tetrahydrofuran, N-methyl-2-pyrrolidone (NMP), ethylmethyl carbonate (EMC), gamma-butyrolactone, and mixtures thereof, but the present invention is not limited thereto.

The foregoing is illustrative of the components of the battery constructed using the anode active material according to the present invention, and in some cases, some of the components may also be deleted or substituted or other components may be added.

Hereinafter, the present invention will be described in detail with reference to examples. It is to be understood, however, that these examples are illustrative purposes, and the scope of the present invention is not limited thereto.

EXAMPLE 1

Hard carbon powder having a mean particle size of 10 μm and anataze-type $TiO_2$ having a mean particle size of 50 nm were introduced into a Mechano-fusion system at a weight ratio of 97:3, and the introduced powders were premixed at about 250 rpm for 10 minutes and then mixed at 1000 rpm for 30 minutes, so that the surface of the hard carbon powder was coated with $TiO_2$. The hard carbon powder thus coated was thermally treated at about 400° C. to prepare a carbon-based anode active material. The measured thickness of the coating layer was about 100 nm.

NMP was added to a mixture of 90 wt % of the anode active material, 9 wt % of PVDF as a binder and 1 wt % of Super-P to prepare slurry. The slurry was coated on a Cu foil, followed by drying at 130° C., thus preparing an anode.

Also, 90 wt % of $LiMn_2O_4$, 5 wt % of Super-P as a conducting material and 5 wt % of PVDF as a binder were mixed with each other and NMP was added thereto to prepare slurry. The slurry was coated on an Al foil, and then dried at 130° C., thus preparing a cathode.

The anode and cathode thus prepared were used to fabricate a bicell-type battery having a structure as disclosed in Korean Patent Laid-Open Publication No. 2001-82059, and a 1M $LiPF_6$ EC/EMC=1:2 electrolyte was injected into the bicell-type battery.

Comparative Example 1

An anode active material, an anode, a cathode and a bicell battery were prepared according to the same condition and method as in Example 1, except that $TiO_2$ was not used.

Comparative Example 2

An anode active material, an anode, a cathode and a bicell battery were prepared according to the same condition and method as in Example 1, except that 3 wt % of $ZrO_3$ was used instead of $TiO_2$.

Comparative Example 3

An anode active material, an anode, a cathode and a bicell battery were prepared according to the same condition and method as in Example 1, except that 3 wt % of MgO was used instead of $TiO_2$.

Comparative Example 4

An anode active material, an anode, a cathode and a bicell battery were prepared according to the same condition and method as in Example 1, except that 3 wt % of $Al_2O_3$ was used instead of $TiO_2$.

<Experiment 1>

The battery fabricated in each of Example 1 and Comparative Examples 1 was charged to 4.2V at 1 mA and discharged to 2.5V at 1 mA. Then, the average manganese concentration of the entire surface of the anode of each battery was measured using an ICP spectrophotometer in a 50% charged state. Then, each of the batteries was stored at 55° C. for 10 days in a 50% charged state and disassembled in a 50% charged state, and the average manganese concentration of the entire surface of the anode was measured using an ICP spectrophotometer. The increase rate of Mn concentration on the anode surface is shown in Table 1 below.

TABLE 1

| (ppm) | Increase rate of Mn concentration on anode surface after storage at 55° C. for 10 days |
|---|---|
| Comparative Example 1 | 509.82% |
| Example 1 | 423.79% |

$TiO_2$ coated on the carbon-based anode active material serves as the Mn scavenger, but shows a decreased amount of Mn reduction compared to the carbon material due to low electron conductivity, resulting in the performance improvement of the manganese-based lithium secondary battery. As can be seen in Table 1, Example 1, in which $TiO_2$ was coated on part of the carbon-based anode active material, showed a decrease in Mn reduction throughout the anode surface compared to Comparative Example 1.

<Experiment 2>

The battery fabricated in each of Example 1 and Comparative Examples 1-4 was charged to 4.2V at 1 mA and discharged to 2.5V at 1 mA. After such initial charge/discharge, the batteries were charged to an upper limit voltage of 4.2V at a current of 10 mA and discharged to an end voltage of 2.5 V, and this charge/discharge cycle was repeated three times, and the capacity of the three cycles was measured. Then, the output of each of the batteries was measured in a 50% charged state, stored at a temperature of 65° C. for 1 week and 2 weeks in a 50% charged state, measured for 3-cycle capacity, and measured for output in a 50% charged state. The output decrease rate of each battery after high-temperature storage is shown in Table 2 below. Then, the bicell battery of Example 1 was disassembled, and the anode surface was washed with a DMC solution and measured for EDS with SEM.

TABLE 2

| Coating oxide | Output retention after 1 week at 65° C. | Output retention after 2 weeks at 65° C. |
|---|---|---|
| Example 1 | 90.1 | 82.4 |
| Comparative Example 1 | 81.5 | 68.3 |
| Comparative Example 2 | 80.2 | 64.4 |
| Comparative Example 3 | 84.1 | 72.7 |
| Comparative Example 4 | 79.9 | 64.6 |

As can be seen in Table 2, the inventive lithium secondary battery (Example 1) employing the $TiO_2$-coated hard carbon powder as the anode active material showed excellent storage characteristics during high-temperature storage at 65° C., compared to the lithium secondary battery employing uncoated hard carbon (Comparative Example 1) and the lithium secondary batteries employing hard carbon coated with each of $ZrO_3$, MgO and $Al_2O_3$ (Comparative Examples 2, 3 and 4).

Such results can be predicted from an SEM photograph showing the EDS (energy dispersive X-ray spectrometry) of the Mn scavenger (e.g., $TiO_2$) of Example 1, the photograph showing that manganese is deposited on $TiO_2$ as the Mn scavenger. Thus, it can be seen that the $TiO_2$ coating layer in Example 1 induces the deposition of manganese during high-temperature storage. Specifically, during long-term storage, manganese is preferentially deposited on the $TiO_2$ coating layer to mitigate the degradation of the carbon-based anode active material, thus preventing the degradation of the carbon material during long-term storage.

INDUSTRIAL APPLICABILITY

As can be seen from the foregoing, through the use of the Mn scavenger according to the present invention, manganese ion dissolved from the manganese-based cathode active material into the electrolyte is preferentially deposited on the Mn scavenger coated on the surface of the anode active material particles, such that the dissolved manganese ion is inhibited from being deposited directly on the surface of the anode active material, and thus a decomposition of the electrolyte with the deposited manganese component is inhibited, thus reducing the degradation of the anode active material. Accordingly, the use of the Mn scavenger according to the present invention can provide a manganese-based lithium secondary battery having excellent high-temperature or long-term storage performance.

The manganese-based lithium secondary battery according to the present invention is very useful as a power source for electric automobiles, which require high output, should be used for a long period of time and are likely to be exposed to high-temperature conditions.

While this invention has been described in connection with what is presently considered to be the most practical and preferred embodiment, it is to be understood that the invention is not limited to the disclosed embodiment and the drawings. On the contrary, it is intended to cover various modifications and variations within the spirit and scope of the appended claims.

What is claimed is:

1. A manganese-based lithium secondary battery, comprising:

a cathode containing manganese-based lithium metal oxide;

an anode; and an electrolyte, wherein the manganese-based lithium metal oxide comprises more than 30 wt % of a manganese spinel-based cathode active material, wherein the anode comprises particles having a core-shell structure, where a particle core is an anode active material and a Mn scavenger layer covers part or all of the surface of the particle core, wherein the anode active material is a carbon-based material, wherein the Mn scavenger layer is $TiO_2$ and is present in an amount of 0.1 to 20 weight percent, based on the total weight of the anode active material, wherein the Mn scavenger layer has a thickness of 3 to 500 nanometers, and wherein the carbon-based material is one or more selected from the group consisting of graphite-based carbon, coke-based carbon and hard carbon.

2. A power source for electric automobiles comprising the manganese-based lithium secondary battery of claim 1.

3. The manganese-based lithium secondary battery of claim 1, wherein the Mn scavenger is present in an amount of 0.1 to 10 weight percent, based on the total weight of the anode active material.

4. The manganese-based lithium secondary battery of claim 1, wherein the Mn scavenger is present in an amount of 0.1 to 3 weight percent, based on the total weight of the anode active material.

5. The manganese-based lithium secondary battery of claim 1, wherein a rate of increase in Mn concentration on a surface of the anode is not greater than 423.79% after storage of the battery at 55° C. for 10 days at 50% charge.

6. The manganese-based lithium secondary battery of claim 1, wherein the battery has an output retention of greater than 84.1% to 90.1% measured at 50% charge after storage at 65° C. for 1 week.

7. The manganese-based lithium secondary battery of claim 1, wherein the battery has an output retention of greater than 72.7% to 82.4% measured at 50% charge after storage at 65° C. for 2 weeks.

8. The manganese-based lithium secondary battery of claim 1, wherein the electrolyte comprises an organic solvent selected from the group consisting of propylene carbonate (PC), ethylene carbonate (EC), diethyl carbonate (DEC), dimethyl carbonate (DMC), dipropyl carbonate (DPC), dimethyl sulfoxide, acetonitrile, dimethoxyethane, diethoxydhane, tetrahydrofuran, N-methyl-2-pyrrolidone (NMP), ethylmethyl carbonate (EMC), gamma-butyrolactone, and mixtures thereof.

* * * * *